(12) United States Patent
Wang et al.

(10) Patent No.: US 9,203,084 B2
(45) Date of Patent: Dec. 1, 2015

(54) CATHODE ACTIVE MATERIAL-COATED DISCRETE GRAPHENE SHEETS FOR LITHIUM BATTERIES AND PROCESS FOR PRODUCING SAME

(71) Applicants: Yanbo Wang, Huber Heights, OH (US); Bor Z Jang, Centerville, OH (US); Hui He, Beavercreek, OH (US); Aruna Zhamu, Centerville, OH (US)

(72) Inventors: Yanbo Wang, Huber Heights, OH (US); Bor Z Jang, Centerville, OH (US); Hui He, Beavercreek, OH (US); Aruna Zhamu, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 179 days.

(21) Appl. No.: 13/987,567

(22) Filed: Aug. 8, 2013

(65) Prior Publication Data
US 2015/0044556 A1 Feb. 12, 2015

(51) Int. Cl.
*H01M 4/36* (2006.01)
*H01M 4/04* (2006.01)
*H01M 4/02* (2006.01)
*H01M 10/056* (2010.01)

(52) U.S. Cl.
CPC ........... *H01M 4/366* (2013.01); *H01M 4/04* (2013.01); *H01M 4/0421* (2013.01); *H01M 10/056* (2013.01); *H01M 2004/028* (2013.01)

(58) Field of Classification Search
CPC ....... H01M 6/00; H01M 10/00; H01M 10/04; H01M 4/625
USPC ............ 429/217, 212, 231.8, 231.7, 219, 405
See application file for complete search history.

(56) References Cited

U.S. PATENT DOCUMENTS

| 7,824,651 | B2 | 11/2010 | Zhamu et al. |
| 8,236,446 | B2 * | 8/2012 | Lu .................................. 429/209 |
| 8,765,302 | B2 * | 7/2014 | Chen et al. ..................... 429/219 |
| 2011/0165466 | A1 * | 7/2011 | Zhamu et al. ............... 429/231.8 |
| 2013/0323603 | A1 * | 12/2013 | Ryu et al. ....................... 429/320 |
| 2014/0013588 | A1 * | 1/2014 | Wang et al. ................... 29/623.2 |
| 2014/0141328 | A1 * | 5/2014 | Dai et al. ....................... 429/217 |

OTHER PUBLICATIONS

Y. Ding, et al. "Preparation of nano-structured LiFePO4/ graphene composites by co-precipitation method," Electrochemistry Communications 12 (2010) 10-13.

* cited by examiner

*Primary Examiner* — Nina Bhat

(57) ABSTRACT

Provided is a cathode (positive electrode) of a lithium battery and a process for producing this cathode. The electrode comprises a cathode active material-coated graphene sheet and the graphene sheet has two opposed parallel surfaces, wherein at least 50% area (preferably greater than 80%) of one of the two surfaces is coated with a cathode active material coating. The graphene material is in an amount of from 0.1% to 99.5% by weight and the cathode active material is in an amount of at least 0.5% by weight (preferably greater than 80% and more preferably greater than 90%), all based on the total weight of the graphene material and the cathode active material combined. The cathode active material is preferably an inorganic material, an organic or polymeric material, a metal oxide/phosphate/sulfide, or a combination thereof. Also provided is a lithium battery, including a lithium-ion, lithium-metal, or lithium-sulfur battery.

35 Claims, 10 Drawing Sheets

10 μm

CATHODE ACTIVE MATERIAL-COATED DISCRETE GRAPHENE SHEETS FOR LITHIUM BATTERIES AND PROCESS FOR PRODUCING SAME

FIELD OF THE INVENTION

The present invention relates generally to the field of lithium metal or lithium ion batteries and, in particular, to a graphene-enhanced cathode of a lithium metal battery, lithium-sulfur battery, or lithium-ion battery.

BACKGROUND

Due to extremely poor electrical conductivity of all cathode (positive electrode) active materials in a lithium-ion, lithium metal, or lithium-sulfur cell, a conductive additive (e.g. carbon black, fine graphite particles, expanded graphite particles, or their combinations), typically in the amount of 5%-20%, must be added into the electrode. In the case of a lithium-sulfur cell, a carbon amount as high as 50% by weight is used as a conductive support for sulfur in the cathode. However, the conductive additive is not an electrode active material (i.e. it is not capable of reversibly storing lithium ions). The use of a non-active material means that the relative proportion of an electrode active material, such as $LiFePO_4$, is reduced or diluted. For instance, the incorporation of 5% by weight of PVDF as a binder and 5% of carbon black as a conductive additive in a cathode would mean that the maximum amount of the cathode active material (e.g., lithium cobalt oxide) is only 90%, effectively reducing the total lithium ion storage capacity. Since the specific capacities of the more commonly used cathode active materials are already very low (140-170 mAh/g), this problem is further aggravated if a significant amount of non-active materials is used to dilute the concentration of the active material.

State-of-the-art carbon black (CB) materials, as a conductive additive, have several drawbacks:

(1) CBs are typically available in the form of aggregates of multiple primary particles that are typically spherical in shape. Due to this geometric feature (largest dimension-to-smallest dimension ratio or aspect ratio ~1) and the notion that CBs are a minority phase dispersed as discrete particles in an electrically insulating matrix (e.g. lithium cobalt oxide and lithium iron phosphate), a large amount of CBs is required to reach a percolation threshold where the CB particles are combined to form a 3-D network of electron-conducting paths.

(2) CBs themselves have a relatively low electrical conductivity and, hence, the resulting electrode remains to be of relatively low conductivity even when the percolation threshold is reached. A relatively high proportion of CBs (far beyond the percolation threshold) must be incorporated in the cathode to make the resulting composite electrode reasonably conducting.

Clearly, an urgent need exists for a more effective electrically conductive additive material. Preferably, this electrically conductive additive is also of high thermal conductivity. Such a thermally conductive additive would be capable of dissipating the heat generated from the electrochemical operation of the Li-ion battery, thereby increasing the reliability of the battery and decreasing the likelihood that the battery will suffer from thermal runaway and rupture. With a high electrical conductivity, there would be no need to add a high proportion of conductive additives.

There have been several attempts to use other carbon nano-materials than carbon black (CB) or acetylene black (AB) as a conductive additive for the cathode of a lithium battery. These include carbon nano-tubes (CNTs), vapor-grown carbon nano-fibers (VG-CNFs), and simple carbon coating on the surface of cathode active material particles. The result has not been satisfactory and hence, as of today, carbon black and artificial graphite particles are practically the only two types of cathode conductive additives widely used in lithium ion battery industry. The reasons are beyond just the obvious high costs of both CNTs and VG-CNFs. The difficulty in disentangling CNTs and VG-CNFs and uniformly dispersing them in a liquid or solid medium has been an impediment to the more widespread utilization of these expensive materials as a conductive additive. Additionally, the production of both CNTs and VG-CNFs normally require the use of a significant amount of transition metal nano particles as a catalyst. It is difficult to remove and impossible to totally remove these transition metal particles, which can have adverse effect on the cycling stability of a lithium metal.

As for the less expensive carbon coating, being considered for use in lithium iron phosphate, the conductivity of the carbon coating (typically obtained by converting a precursor such as sugar or resin via pyrolyzation) is relatively low. It would take a graphitization treatment to render the carbon coating more conductive, but this treatment requires a temperature higher than 2,000° C., which would degrade the underlying cathode active material (e.g., $LiFePO_4$).

As an alternative approach, Ding, et al investigated the electrochemical behavior of $LiFePO_4$/graphene composites [Y. Ding, et al. "Preparation of nano-structured $LiFePO_4$/graphene composites by co-precipitation method," Electrochemistry Communications 12 (2010) 10-13]. The co-precipitation method leads to the formation of $LiFePO_4$ nano-particles coated on both primary surfaces of graphene nano-sheets. The cathode is then prepared by stacking these $LiFePO_4$-coated graphene sheets together. This approach has several major drawbacks:

(1) With the two primary surfaces of a graphene sheet attached with $LiFePO_4$ nano-particles, the resulting electrode entails many insulator-to-insulator contacts between two adjoining coated sheets in a stack.

(2) Only less than 30% of the graphene surface area is covered by $LiFePO_4$ particles on either side. This is a relatively low proportion of the cathode active material.

(3) The $LiFePO_4$ particles are easily detached from graphene sheets during handling and electrode production.

(4) We have found that the nano particle-attached graphene sheets as prepared by the co-precipitation method are not amenable to fabrication of cathodes with current electrode coating equipment. In particular, these particle-attached graphene sheets could not be compacted into a dense state with a high mass per unit electrode volume. In other words, the cathode tap density is relatively low. This is a very serious issue since all of the commonly used cathode active materials, including $LiFePO_4$, already have a very low specific capacity (mAh/g), and not being able to pack a large mass of a cathode active material into a given electrode volume would mean an excessively low overall capacity at the cathode side. (It may be noted that the typical specific capacity (140-170 mAh/g) of a cathode active material is already much lower than that (330-360 mAh/g) of an anode active material. Such an imbalance has been a major issue in the design and fabrication of lithium ion batteries).

Thus, it is an object of the present invention to provide a thermally and electrically conductive cathode active material that can be easily incorporated in a cathode electrode of a lithium battery.

A specific object of the present invention is to provide a cathode active material-coated discrete graphene sheets (as primary particles) that readily aggregate into secondary particles (herein also referred to as particulates) that are more amenable to mass production of cathodes using current production equipment.

A particularly desirable specific object of the present invention is to provide cathode active material-coated graphene sheets that are more conducive to the formation of a 3-D network of electron-conducting paths, imparting exceptional conductivity to the cathode and enabling the cathode to become high-rate capable.

The cathode active material-coated graphene sheets disclosed herein, typically 0.3 µm-10 µm long or wide, have a graphene sheet thickness in the range of 0.5 nm to 10 nm and cathode active material coating thickness in the range of 2 nm to 100 nm (more typically 5-50 nm). The cathode active material loading (percentage) is typically >80%, more typically >90%, and most typically 95-99%. This active material proportion is readily adjustable.

Another object of the present invention is to provide a process to produce cathode active material-coated graphene sheets.

A further object of the present invention is to provide a cathode electrode that has a high cathode active material proportion and a rechargeable battery that contains such a cathode electrode.

SUMMARY OF THE INVENTION

The present invention provides a cathode (positive electrode) of a lithium battery, which is a lithium-ion battery, lithium metal battery (using lithium metal as a primary anode active material), or lithium-sulfur battery. The cathode electrode comprises one or multiple cathode active material-coated graphene sheets, wherein the graphene sheet has two opposed parallel surfaces and at least 50% area of one of the two surfaces is coated with a cathode active material coating (the other surface typically free of cathode active material). In the coated sheet, the graphene material is in an amount of from 0.1% to 99.5% by weight and the cathode active material is in an amount of at least 0.5% by weight, all based on the total weight of said graphene material and the cathode active material combined.

Preferably, at least 80% area of one of the surfaces is coated with a cathode active material. In a preferred embodiment, the coated graphene sheet contains at least 60% (preferably at least 80% and further preferably at least 90%) by weight or by volume of the cathode active material based on the total weight of said coated graphene sheet.

In the cathode electrode, the cathode active material may be selected from a metal oxide/phosphate/sulfide, an inorganic material, an organic or polymeric material, or a combination thereof:

a) the group of metal oxide, metal phosphate, and metal sulfides consisting of lithium cobalt oxide, lithium nickel oxide, lithium manganese oxide, lithium vanadium oxide, lithium transition metal oxide, lithium-mixed metal oxide, lithium iron phosphate, lithium manganese phosphate, lithium vanadium phosphate, lithium mixed metal phosphates, transition metal sulfides, and combinations thereof.

a. In particular, the lithium vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$;
  b. Lithium transition metal oxide may be selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

b) an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) sulfur, sulfur compound, lithium polysulfide (f) a combination thereof. In particular, $TiS_2$, $TaS_2$, $MoS_2$, $NbSe_3$, non-lithiated $MnO_2$, $CoO_2$, iron oxide, vanadium oxide, or a combination thereof may be used as a cathode active material in a lithium metal cell.

c) The organic material or polymeric material may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]$ n), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

The organic material may include a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The graphene material is selected from pristine graphene, graphene oxide, reduced graphene oxide, graphene fluoride, graphene bromide, graphene iodide, boron-doped graphene, nitrogen-doped graphene, chemically functionalized graphene, or a combination thereof, and the graphene material comprises single-layer or less than 10 graphene planes. Preferably, the cathode active material coating has a thickness less than 100 nm, more preferably less than 50 nm, and most preferably less than 20 nm.

Multiple sheets of cathode active material-coated graphene may be combined, with additional graphene sheets (optional) or other conductive additives (optional), to form a secondary particle having a size preferably less than 20 μm, further preferably less than 10 μm, and most preferably less than 5 μm. The additional conductive additive incorporated into the secondary particles may be a carbon or graphite material selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof.

The invention also provides a lithium battery containing an anode electrode, a cathode electrode as described above, a porous separator and/or electrolyte in contact with the anode electrode and the cathode electrode. The lithium battery may further comprise an anode current collector and/or a cathode current collector. The lithium battery may be a lithium metal secondary battery, wherein the anode electrode contains a lithium metal, lithium metal alloy, or lithium compound as an anode active material. The lithium battery may be a lithium-sulfur cell wherein the anode electrode contains a lithium metal, lithium metal alloy, or lithium compound as an anode active material and the cathode electrode contains sulfur, sulfur compound, or lithium polysulfide as a cathode active material.

The present invention also provides a cathode active material-coated graphene sheets and a process for producing such a graphene-enhanced cathode active material. The process comprises (a) providing a continuous film of a graphene material into a deposition zone; (b) introducing vapor or atoms of a precursor cathode active material into the deposition zone, allowing the vapor or atoms to deposit onto a surface of the graphene material film to form a coated film of a cathode active material-coated graphene; and (c) mechanically breaking this coated film into multiple pieces of cathode active material-coated graphene sheets; wherein the graphene material is in an amount of from 0.1% to 99.5% by weight and the cathode active material is in an amount of at least 0.5% by weight, all based on the total weight of the graphene material and the cathode active material combined.

Steps (a) and (b) can be conducted in a roll-to-roll manner that includes feeding a continuous film of a graphene material from a feeder roller into a deposition zone and collecting the coated film onto a winding roller.

The graphene material may be selected from pristine graphene, graphene oxide, reduced graphene oxide, graphene fluoride, graphene bromide, graphene iodide, boron-doped graphene, nitrogen-doped graphene, chemically functionalized graphene, or a combination thereof, and the graphene material is preferably of single-layer or few-layer sheets (less than 10 graphene planes).

In a preferred version of the process, the continuous film of a graphene material may be produced by (a) spraying a graphene suspension onto a solid substrate, wherein the graphene suspension contains a graphene material dispersed in a liquid medium, and (b) by removing said liquid medium. Alternatively, the continuous sheet of a graphene material may be produced by chemical vapor deposition of a graphene material onto a solid substrate.

The coated film (the sheet of a cathode active material-coated graphene material film) preferably has a cathode active material coating thickness less than 500 nm, more preferably less than 100 nm, further preferably less than 50 nm, most preferably less than 20 nm. The coated film may be produced through chemical vapor deposition, physical vapor deposition, sputtering, or laser-assisted thin-film deposition of an anode active material onto a sheet of a graphene material.

In the process, step (c) of mechanical breaking can be conducted using air jet milling, impact milling, grinding, mechanical shearing, ultrasonication, or a combination thereof.

The process can further comprise a step of shaping those multiple pieces of cathode active material-coated graphene material into a secondary particle having a size less than 20 μm, preferably less than 10 μm, and more preferably less than 5 μm. Preferably, this secondary particle is spherical in shape. The step of shaping multiple pieces of cathode active material-coated graphene material into a secondary particle may comprise dispersing the multiple pieces of cathode active material-coated graphene in a liquid medium to form a multi-component suspension and drying the multi-component suspension to form the secondary particle using a spray-drying, spray-pyrolysis, fluidized-bed drying, atomization, or aerosolizing technique.

In a preferred process, step (b) further comprises depositing a layer of carbon or graphite material onto a surface of the sheet of cathode active material-coated graphene. This carbon or graphite material can act as a supplementary conductive additive that works with graphene to form a robust 3-D network of electron-conducting path that remains in contact with the cathode active material during the battery charge and discharge. This carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. The polymeric carbon or amorphous carbon may be obtained from pyrolyzation of a polymer selected from the group consisting of phenol-formaldehyde, polyacrylonitrile, styrene-based polymers, cellulosic polymers, epoxy resins, and combinations thereof.

The process may further comprise a step of separating or removing the supporting graphene sheet from the cathode active materials and a step of collecting the separated cathode active material. This is a surprisingly simple and cost-effective way of mass-producing free-standing, nanometer-thin cathode active materials (e.g. as thin as 2-20 nm with a length/width from 30 nm to several microns). No prior art method offers such a versatile capability.

Alternatively, the process can further comprise a step of mixing multiple pieces of cathode active material-coated graphene sheets, additional un-coated graphene sheet(s), and a conductive filler to form a secondary particle. Such a secondary particle may be composed of small active material-coated graphene sheets (e.g. <3 μm in length) and conductive additive (such as carbon black) which are embraced by graphene sheets to form a more or less spherical particle.

Further alternatively, the process can further comprise a step of mixing multiple pieces of cathode active material-coated graphene material sheets and a resin binder and/or a conductive filler to form a cathode layer on a cathode current collector.

DETAILED DESCRIPTION OF PREFERRED EMBODIMENTS

This invention is directed at graphene-enabled cathode active materials, a process for producing such a cathode active material, a cathode (positive electrode) containing such a cathode active material, and a lithium battery containing such a cathode. This lithium battery can be a primary battery, but is preferably a secondary battery selected from a lithium-ion battery, a lithium metal secondary battery (e.g. using lithium metal as an anode active material), or a lithium-sulfur battery. The battery is based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present invention is not limited to any battery shape or configuration.

For convenience, we will use lithium iron phosphate (LFP), vanadium oxide ($V_xO_y$), sulfur (S), and copper phthalocyanine (CuPc) as illustrative examples of the cathode active material. This should not be construed as limiting the scope of the invention.

Figure 5A:
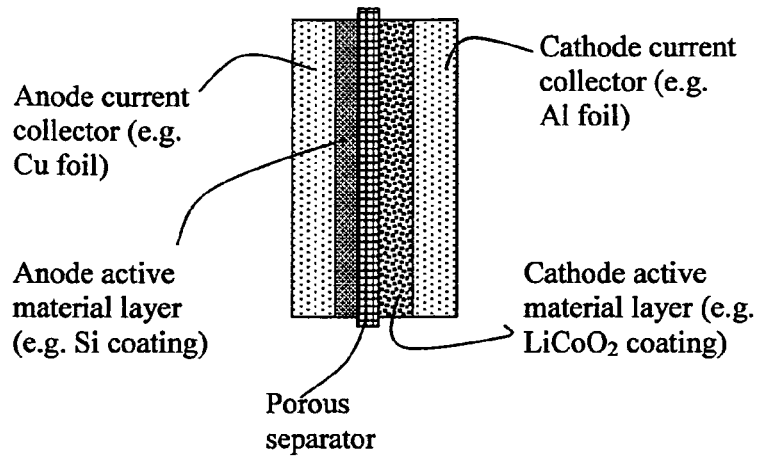
FIG. 5 (A) schematic of a prior art lithium-ion battery cell composed of an anode current collector, an anode electrode (e.g. thin Si coating layer), a porous separator, a cathode electrode (e.g. sulfur layer), and a cathode current collector; (B) the electrode layer is composed of discrete particles of an active material (e.g. graphite or tin oxide particles in the anode layer or $LiCoO_2$ in the cathode layer).
Figure 5B:
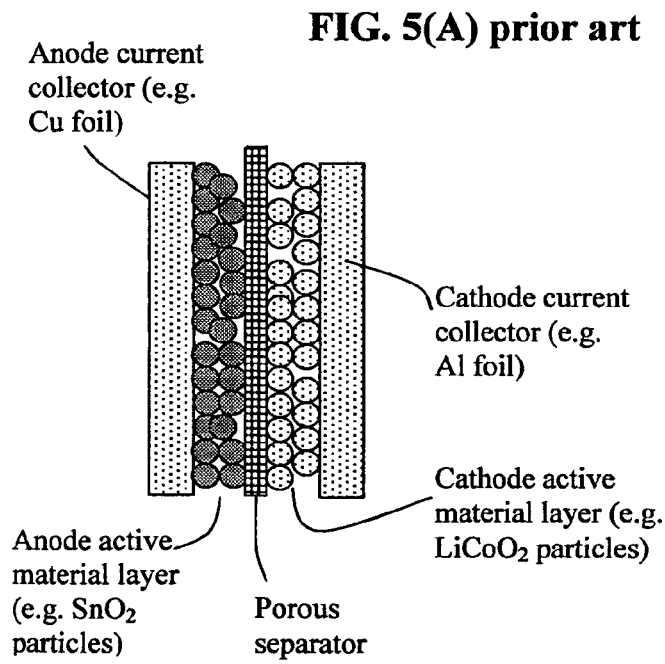

As illustrated in FIGS. 5(A) and 5(B), a lithium-ion battery cell is typically composed of an anode current collector (e.g. Cu foil), an anode electrode (anode active material layer), a porous separator and/or an electrolyte component, a cathode electrode (cathode active material layer), and a cathode current collector (e.g. Al foil). In a more commonly used cell configuration (FIG. 5(B)), the anode layer is composed of particles of an anode active material (e.g. graphite or Si), a conductive additive (e.g. carbon black particles), and a resin binder (e.g. SBR or PVDF). The cathode layer is composed of particles of a cathode active material (e.g. LFP particles), a conductive additive (e.g. carbon black particles), and a resin binder (e.g. PVDF). Both the anode and the cathode layers are typically 100-300 μm thick to give rise to a sufficient amount of current per unit electrode area. This thickness range is an industry-accepted constraint under which a battery designer must work. This constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <100 μm) does not contain a sufficient amount of an active lithium storage material (hence, insufficient current output); and (c) all non-active material layers in a battery cell (e.g. current collectors and separator) must be kept to a minimum in order to obtain a minimum overhead weight and a maximum lithium storage capability and, hence, a maximized energy density (Wk/kg or Wh/L of cell).

In a less commonly used cell configuration, as illustrated in FIG. 5(A), either the anode active material (e.g. Si) or the cathode active material (e.g. S) is deposited in a thin film form directly onto a current collector, such as a sheet of copper foil or Al foil. However, such a thin film structure with an extremely small thickness-direction dimension (typically much smaller than 500 nm, often necessarily thinner than 100 μm) implies that only a small amount of active material can be incorporated in an electrode (given the same electrode or current collector surface area), providing a low total lithium storage capacity and low lithium storage capacity per unit electrode surface area. Such a thin film must have a thickness less than 100 nm to be more resistant to cycling-induced cracking (for the anode) or to facilitate a full utilization of the cathode active material. Such a constraint further diminishes the total lithium storage capacity and the lithium storage capacity per unit electrode surface area. Such a thin-film battery has very limited scope of application. (On the other hand, a Si layer thicker than 100 nm has been found to exhibit poor cracking resistance during battery charge/discharge cycles. It takes but a few cycles to get fragmented). A sulfur layer thicker than 100 nm does not allow lithium ions to fully penetrate and reach full body of the S layer, resulting in a poor sulfur utilization rate. A desirable electrode thickness is at least 100 μm, with individual active material coating or particle having a dimension desirably less than 100 nm. These thin-film electrodes (with a thickness <100 nm) directly deposited on a current collector fall short of the required thickness by three (3) orders of magnitude. As a further problem, all of the cathode active materials are not conductive to both electrons and lithium ions. A large layer thickness implies an excessively high internal resistance and a poor active material utilization rate.

In other words, there are several conflicting factors that must be considered concurrently when it comes to the design and selection of a cathode or anode active material in terms of material type, shape, size, porosity, and electrode layer thickness. Thus far, there has been no effective solution offered by any prior art teaching to these often conflicting problems. We have solved these challenging issues that have troubled battery designers and electrochemists alike for more than 30 years by developing the cathode active material-coated graphene sheets as herein disclosed.

Figure 6A:
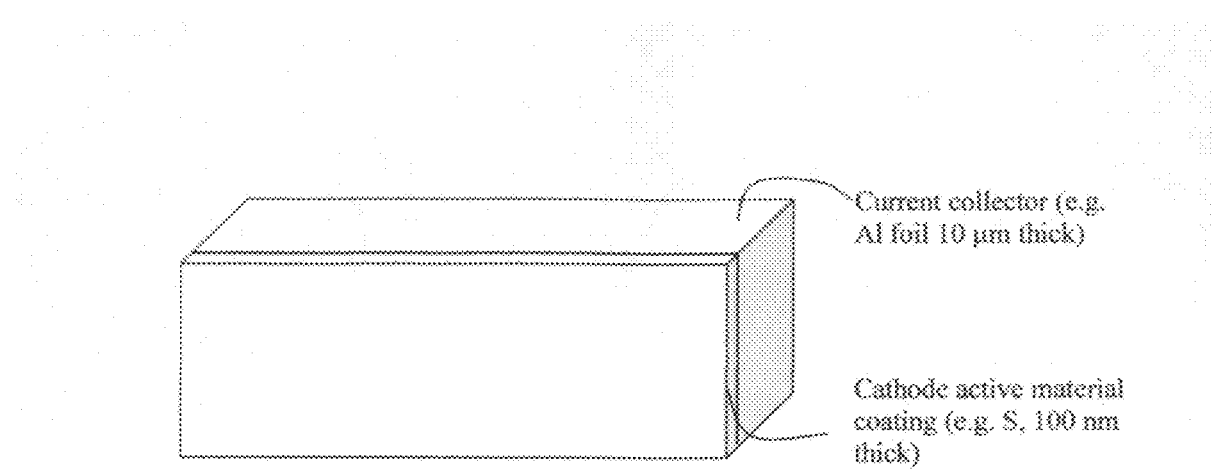
FIG. 6 (A) a prior art cathode containing a thin film S coated on a sheet of Al foil current collector; (B) schematic of an example of a S-coated graphene sheet of the present invention.

An embodiment of the present invention is a graphene-enhanced cathode active material, which is a cathode active material-coated graphene sheet. In such a coated sheet, the graphene material is in an amount from 0.1% to 99.5% by weight and the cathode active material is in an amount of at least 0.5% by weight (typically and preferably >60%, more typically and preferably >80%, and most typically and preferably >90%), all based on the total weight of the graphene material and the cathode active material combined. These pieces of coated sheets have a typical length/width from 100 nm to 10 μm, more typically 500 nm to 5 μm (but most preferably <3 μm). Typically, at least 60% of the surface area of a primary surface of the supporting graphene sheet is covered by a thin layer of the desired active material (e.g. S or $MoS_2$). This surface coverage is preferably >80%, more preferably >90%, and most preferably >99%. The thickness of the cathode active material coating layer is preferably from 2 nm to 100 nm, and more preferably from 5 nm to 20 nm. There are significant and non-trivial reasons for specifying these preferred dimensions, further explained below:

As illustrated in FIG. 6(A), a prior art cathode is a thin film sulfur or lithium polysulfide coated on a sheet of Al foil current collector. The thinnest available Al foil is 10-20 μm thick and the maximum S coating film thickness is 100 nm, beyond which the S layer would not allow for a high sulfur utilization rate. This problem is not just limited to S; rather, it is observed for all active materials in a thin film form. With such a configuration (e.g. 10 μm thick Al foil and 100 nm thick S film), the volume fraction of S (the active material responsible for storing or discharging lithium) is only 100/[100+10,000]=1/101<1%. With an Al physical density of 2.7 g/cm$^3$ and S density of 2.0 g/cm$^3$, this implies a S weight fraction less than 1%. In other words, more than 99% by weight or by volume of this configuration is aluminum, which is not a cathode active material incapable of reversibly storing lithium ions in a battery cell. This is an extremely undesirable and non-efficient battery design.

Figure 6B:
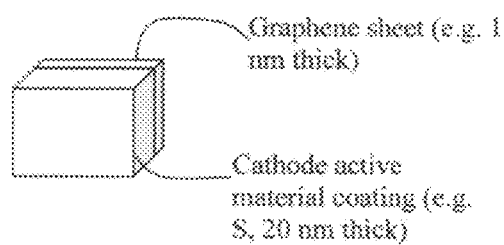

By contrast, referring to FIG. 6(B) as an illustrative example, the sulfur coating layer is 20 nm thick and the supporting graphene sheet is 1 nm thick, implying a cathode active material percentage of 20/21=95% by volume. With a graphene physical density of 2.2 g/cm$^3$ and S density of 2.0 g/cm$^3$, this implies a sulfur weight fraction of approximately 94.7%, having a very minimal non-active material. The supporting graphene sheet plays the role of a conducting filler, and every piece of sulfur is guaranteed to be in direct physical contact with an underlying, highly conducting graphene sheet. Graphene has an electrical conductivity higher than the conductivity of carbon black by at least 3 orders of magnitude. During battery operations, both electrons and lithium ions only have to travel to a maximum path length of 20 nm, resulting in very low internal resistance, and such a short transport path also enables fast charge and recharge of a battery cell leading to a high rate capability. These features have not been possible with any prior art cathode active materials and electrodes.

Figure 4:
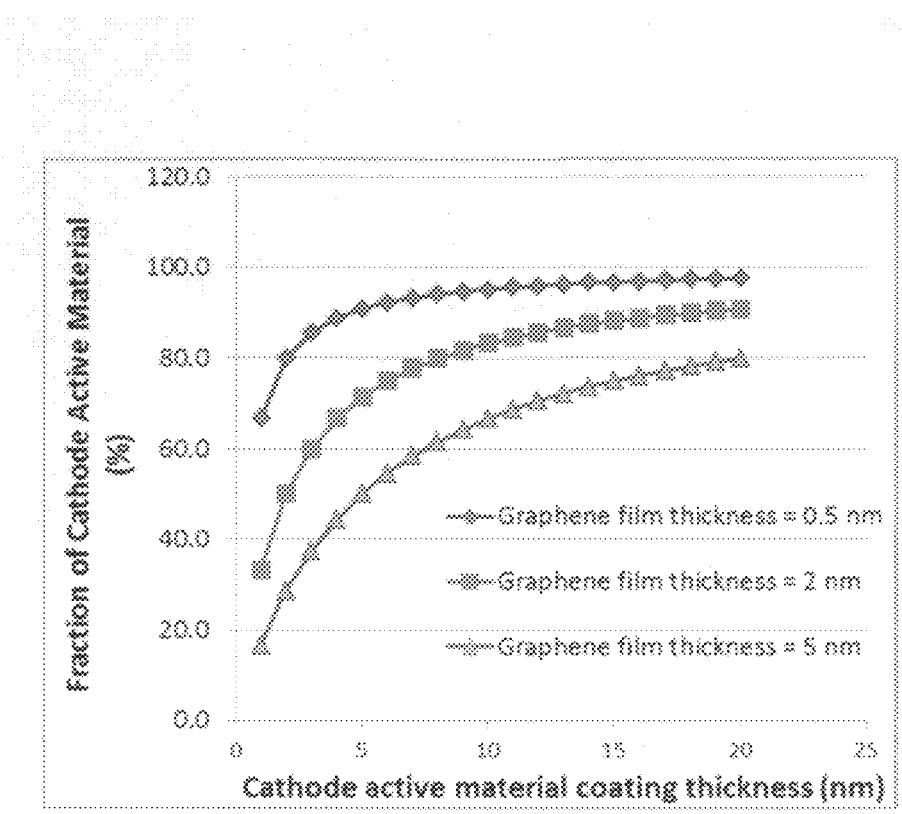
FIG. 4 The cathode active material coating volume fraction of coated graphene sheets plotted as a function of the active material coating thickness for various graphene platelet thickness values.

FIG. 4 shows the volume fraction of the S coating in S-coated graphene sheets plotted as a function of the S coating thickness for various graphene platelet thickness values. This chart indicates that, with a single-layer graphene sheet (<0.5 nm thick), a S coating thickness as thin as 1 nm implies a S volume fraction >66%. One can imagine that such an ultra-thin S coating would enable extremely easy transport of both the electrons and lithium ions with ultra-low resistance, enabling ultra-fast battery charge and discharge. A sulfur coating thickness of 20 nm would mean a S volume or weight fraction >96%, leaving behind very low percentage of non-active material. With a multi-layer graphene platelet as a supporting substrate (e.g. 5 nm), a S coating thickness of 8 nm is sufficient to achieve an active material percentage >60%. One might argue that one could easily achieve a sulfur loading higher than 70%, 80%, or even 90% by simply mixing sulfur with a carbon material less than 30%, 20%, or 10%. However, in such a mixture, a significant proportion of the sulfur is present in large zones or domains significantly larger than 100 nm in size. As such, a high percentage of sulfur would not be readily accessible to lithium ions and the sulfur utilization rate is low. In a conventional Li—S cell, a carbon loading as high as 50% is very common. Even with such a high percentage of inactive material, the sulfur utilization rate remains very low. This is why one often observes a sulfur cathode specific capacity of <600 mAh/g even though the theoretical capacity of sulfur is 1,675 mAh/g. (With 50% carbon and 50% sulfur, the composite sulfur is expected to give rise to a cathode specific capacity of 1,675×0.5=837.5 mAh/g, based on the composite weight, provided that 100% of the sulfur is fully utilized. But, the actual capacity is normally significantly lower than this. An actual capacity of 600 mAh/g would mean a sulfur utilization rate of 600/837.5=71.6%. This low sulfur utilization rate has been a most serious problem associated with Li—S batteries).

We have further observed that the presently invented cathode active material-coated graphene sheets can be combined, with or without additional neat graphene sheets and/or other conductive additive, into secondary particles, typically 1-20 μm in diameter. With the length/width of the supporting graphene sheets being in the range of 300 nm to 5 μm, the secondary particle typically has a diameter less than 10 μm. With a supporting graphene sheet length <3 μm, the resulting secondary particle has a typical diameter <5 μm, which is ideal for use as a cathode active material in terms of electrode production ease, electrode tap density, rate capability, and cycling stability of resulting lithium batteries. These observations mean that the presently invented cathode active material-coated graphene sheets are ideal cathode structures.

In an embodiment of the present invention, the process for producing such a cathode-coated sheet comprises (a) providing a continuous film of a graphene material into a deposition zone; (b) introducing vapor or atoms of a precursor cathode active material into the deposition zone, allowing the vapor or atoms to deposit onto a surface of the graphene material film to form a coated film of a cathode active material-coated graphene material; and (c) mechanically breaking this film into multiple pieces of cathode active material-coated graphene sheets. This process may further include a step (d) of combining multiple pieces of cathode active material-coated graphene sheets, along with an optional binder and/or an optional carbon/graphite material, to form multiple secondary particles that are then combined to form a cathode electrode. Step (d) may entail combining multiple pieces of cathode active material-coated graphene sheets, along with an optional binder and/or an optional carbon/graphite material, to directly form a cathode electrode without going through the intermediate step of forming secondary particles.

Figure 1:
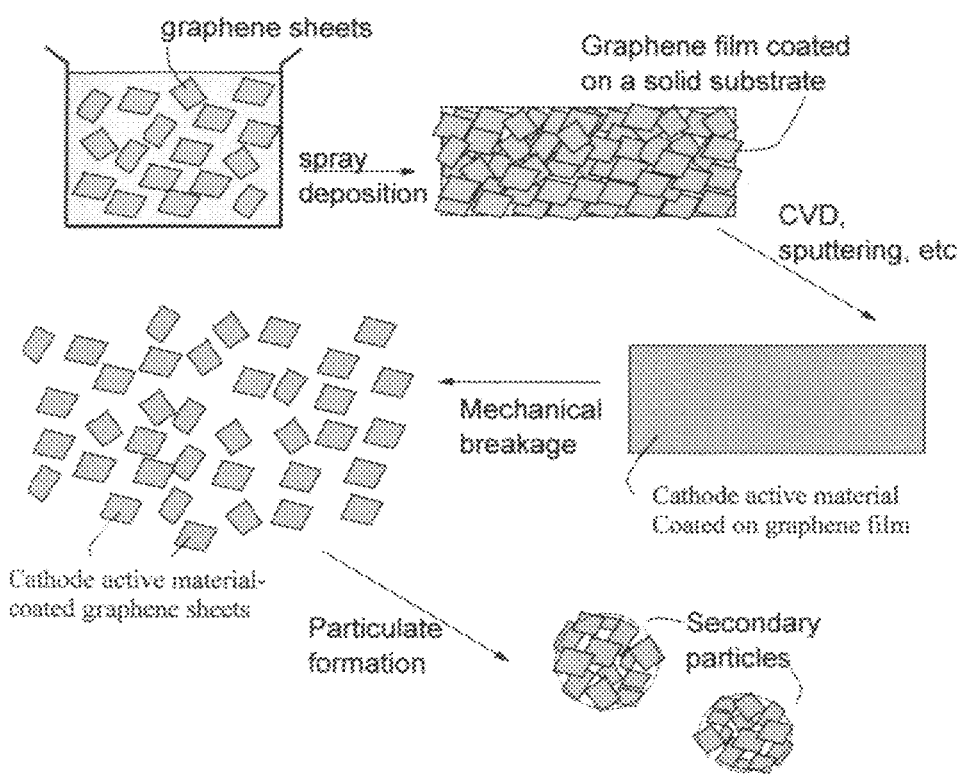
FIG. 1 Schematic of a process for producing cathode active material-coated graphene sheets.

In step (a), the continuous sheet of a graphene material (the continuous film) may be produced by chemical vapor deposition (CVD) of graphene onto a solid substrate. However, the CVD is an expensive process. Alternatively and preferably, as illustrated in FIG. 1, this continuous film may be produced by preparing a suspension of graphene material sheets (e.g. graphene oxide sheets) in a liquid medium (e.g. water) and spraying the suspension onto a solid substrate surface to form a graphene film. Preferably, an ultrasonic spraying or electrostatic spraying device is used to propel and deposit graphene material sheets onto the substrate surface so that multiple graphene material sheets are overlapped to form a cohered film or sheet, from approximately 0.5 nm to several micron thick (preferably from 1 nm to 20 nm).

This graphene film, with or without the supporting substrate, is then introduced into a deposition zone (e.g. a vacuum chamber or a CVD chamber) wherein streams of vapor or atoms of a cathode active material are deposited onto one surface of the graphene film to form a coated film (e.g. S-coated graphene film). This deposition may be accomplished through physical vapor deposition (PVD), sputtering, laser-assisted deposition, chemical vapor deposition, including plasma-enhanced CVD and hot-wire CVD, atomic layer deposition, and deposition from solution. The thickness of the anode active material coating is preferably less than 500 nm thick, more preferably less than 100 nm, further preferably less than 50 nm, and most preferably less than 20 nm.

Again referring to FIG. 1, the cathode material-coated graphene film is then subjected to mechanical breakage to produce pieces of cathode active material-coated graphene sheets with a lateral dimension preferably in the range of 0.3 μm to 10 μM, but further preferably from 0.5 μm to 3 μm. These size ranges are particularly suitable for combining these primary particles (cathode active material-coated graphene sheets) into secondary particles or particulates with a diameter in the range of 1 μm to 10 μm, preferably less than 5 μm. These secondary particles with proper sizes are amenable to the fabrication of cathode material layers on a cathode current collector using conventional slurry coating processes. The slurries containing these secondary particles are found to have very desirable viscosity and other flow characteristics. They flow very well on the surface of a cathode current collector (e.g. Al foil). The resulting electrode thickness can be from 50 μm to 500 μm or thicker, but most preferably from 100 μm to 250 μm.

As illustrated in the top portion of FIG. 1, the use of a graphene film prepared by deposition from a graphene suspension is preferred over a CVD graphene film because of the need to break the film, after being coated with a cathode active material, into small pieces of coated graphene sheets. The continuous graphene film made from overlapped graphene sheets can be readily broken along the original graphene sheet boundaries. The resulting coated graphene sheets are comparable in sizes to the original graphene material sheets. The suspension-derived graphene film is much weaker than the CVD graphene film. However, we have turned this weakness into an advantageous feature for the production of coated graphene sheets of desired sizes.

The present invention provides a nano graphene-enhanced particulate (secondary particle) for use as a lithium-ion battery electrode material. The supporting graphene film is preferably made from single-layer graphene or few-layer graphene (up to 10 graphene planes, or approximately <4-5 nm). This supporting film preferably has a thickness between 0.4 nm and 20 nm, more preferably between 0.4 nm and 5 nm.

A nano graphene platelet (NGP) or graphene sheet is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single-layer graphene) to 100 nm (multi-layer). For the present electrode use, the preferred thickness is <10 nm and most preferably <3 nm or 10 layers). The presently invented anode active material-coated sheets and the resulting graphene-enhanced secondary particle or particulate preferably contains mostly single-layer graphene, but could make use of some few-layer graphene (less than 10 layers). The graphene sheet may contain a small amount (typically <25% by weight) of non-carbon elements, such as hydrogen, boron, fluorine (or other halogen), nitrogen, and oxygen, which are attached to an edge or surface of the graphene plane. Graphene was recently discovered to exhibit the highest thermal conductivity of all existing materials. In addition to the electrical conductivity, this high thermal conductivity is clearly an advantageous property that could not be achieved by any other type of conductive additives. Graphene also exhibits the highest intrinsic strength among all materials ever reported.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphene fluoride.

The NGPs may be obtained from exfoliation and platelet separation of a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or graphitized polymeric carbon.

In a preferred version of the process, the continuous film of a graphene material may be produced by (a) spraying a graphene suspension onto a solid substrate, wherein the graphene suspension contains discrete sheets or platelets of a graphene material dispersed in a liquid medium, and (b) removing the liquid medium. Alternatively, the continuous sheet of a graphene material may be produced by chemical vapor deposition of a graphene material onto a solid substrate.

The sheet of a cathode active material-coated graphene film preferably has a cathode active material coating thickness less than 500 nm, more preferably less than 100 nm, further preferably less than 50 nm, most preferably less than 20 nm. The coated sheet may be produced through chemical vapor deposition, physical vapor deposition, sputtering, or laser-assisted thin-film deposition of an anode active material onto a sheet of a graphene material.

In the process, step (c) of mechanical breaking can be conducted using air jet milling, impact milling, grinding, mechanical shearing, ultrasonication, or a combination thereof.

Figure 2:
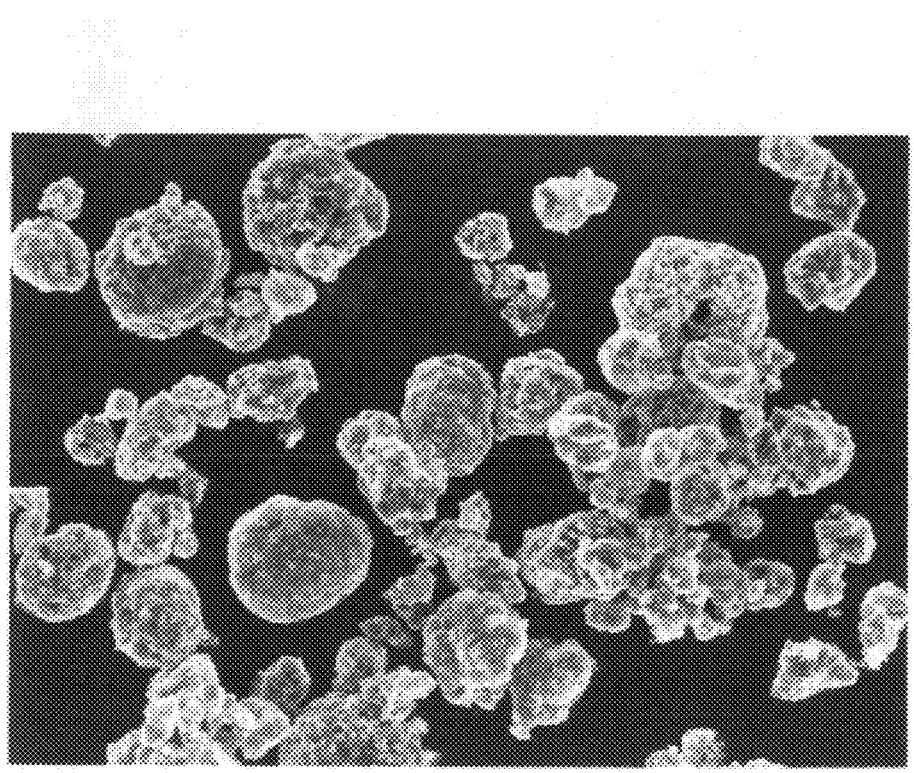
FIG. 2 SEM image of a graphene-enhanced cathode particulate (secondary particle) according to a preferred embodiment of the present invention FIG. 3 SEM image of a graphene-enhanced anode particulate (secondary particle) for comparison purpose.
Figure 3:
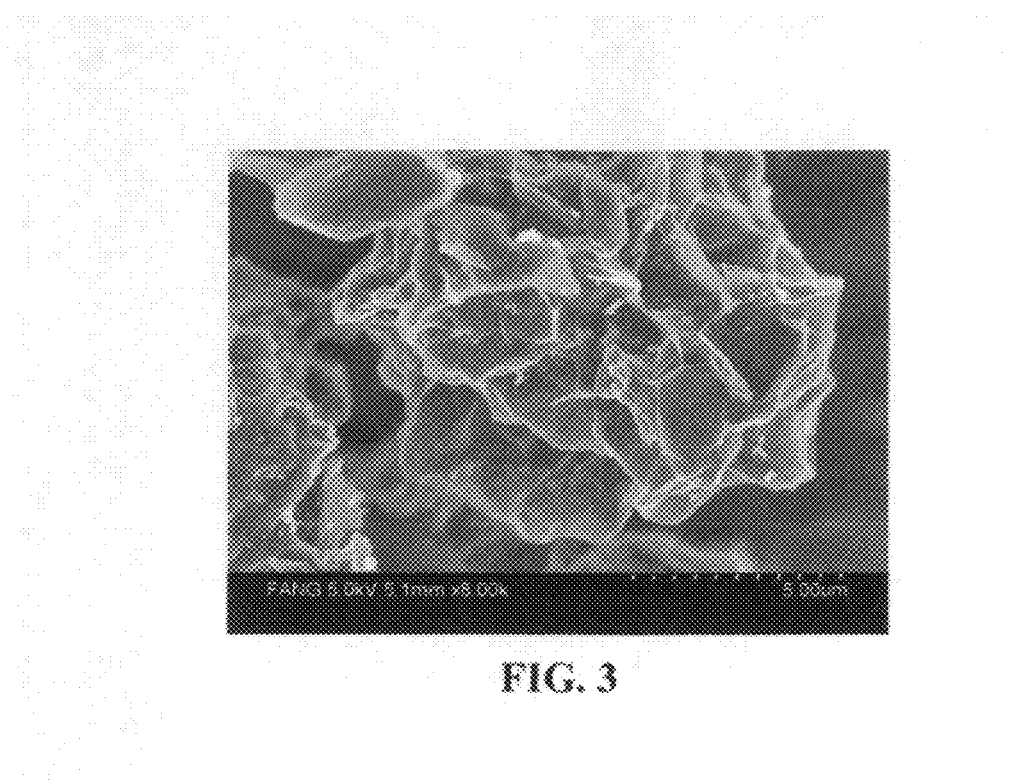

FIG. 2 shows an example of graphene-enhanced particulates comprising graphene sheets in and around the particulate. Graphene sheets embrace and protect the primary particles (S-coated graphene sheets) to form secondary particles (particulates) that are easier to handle in a real anode production environment. The embracing graphene sheets also prevent sulfur from getting dissolved in electrolyte (a major cause for rapid capacity decay in a Li—S cell). The notion that the exterior surface is embraced with highly conductive graphene sheets implies that these sheets can naturally form a 3-D network of electron-conducting paths when multiple particulates are packed together in an anode. FIG. 3 shows a corresponding particulate from Si-coated graphene sheets for use in an anode of a lithium-ion battery.

These more or less spherical secondary particles can be easily handled and made into electrodes using existing battery electrode coating machines. These particulates were found to lead to electrodes that have a higher tap density (weight per volume of the electrode), which is a very important parameter for an electrode.

As a preferred embodiment, the process of producing graphene-enhanced particulates from active material-coated graphene sheets comprises (i) preparing a precursor mixture of graphene or graphene precursor with a cathode active material-coated graphene sheets; and (ii) thermally and/or chemically converting the precursor mixture to the graphene-enhanced anode particulate. Described in more detail, the process entails:

(a) dispersing or immersing a laminar graphite material (e.g., graphite powder) in a mixture of an intercalant and an oxidant (e.g., concentrated sulfuric acid and nitric acid, respectively) to obtain a graphite intercalation compound (GIC) or graphite oxide (GO);

(b) exposing the resulting GIC or GO to a thermal shock, preferably in a temperature range of 600-1,100° C. for a short period of time (typically 15 to 60 seconds), to obtain exfoliated graphite or graphite worms; and (c) dispersing exfoliated graphite in a liquid (e.g. water) and mechanically separating individual nano graphene platelets or sheets from graphite worms using, for instance, a high-shear mixer or an ultrasonicator to obtain a graphene or graphene precursor suspension; or, alternatively, (d) re-dispersing the exfoliated graphite to a liquid medium containing an acid (e.g., sulfuric acid), an oxidizing agent (e.g. nitric acid), or an organic solvent (e.g., NMP) at a desired temperature for a duration of time until the exfoliated graphite is converted into graphene oxide or graphene dissolved in the liquid medium. The acid is preferably a weak acid (such as diluted sulfuric acid) or a more environmentally benign acid, such as formic acid, acetic acid, citric acid, carboxylic acid, and combinations thereof. The exfoliated graphite, when dispersed in these acids, was gradually dispersed and essentially dissolved to form a graphene or graphene oxide solution or suspension. Although not a required operation, stirring, mechanical shearing, or ultrasonication can be used to accelerate the dispersion and dissolution step;

(e) dispersing cathode active material-coated graphene sheets to the graphene or graphene precursor solution or suspension prepared in step (c) or step (d) to obtain a precursor mixture suspension; and (f) thermally and/or chemically converting the precursor mixture to the graphene-enhanced anode particulate.

An optional, but desirable intermediate step between (e) and (f) involves drying the suspension to form the precursor mixture in a solid state. If the precursor mixture contains a precursor to graphene (e.g. graphene oxide), then the precursor may be subjected to a chemical or thermal reduction treatment. A heat treatment at a temperature of preferably 500-1,000° C. for 1-2 hours would serve to eliminate a majority of the oxygen content from the graphene sheets.

The carboxylic acid used in step (d) may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_n COOH$, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

In step (e), optionally, particles of a carbon or graphite material may be added along with the cathode active material-coated graphene sheets.

The step of drying the multi-component suspension to form the precursor mixture may be conducted using a spray-drying, spray-pyrolysis, fluidized-bed drying procedure, or any step that involves atomizing or aerosolizing the suspension. The step of converting may comprise a sintering, heat-treatment, spray-pyrolysis, or fluidized bed drying or heating procedure. The step of converting may comprise a procedure of chemically or thermally reducing the graphene precursor to reduce or eliminate oxygen or fluorine content and other non-carbon elements of the graphene precursor, which graphene precursor may contain graphene oxide or graphene fluoride. Upon conversion, the graphene in the particulate has an oxygen content typically less than 5% by weight.

As another preferred embodiment, the process may begin with the production of a precursor solution or suspension of pristine graphene (non-oxidized graphene) directly from graphite particles, which is followed by the addition of a cathode active material-coated graphene sheets to this solution or suspension to obtain a precursor mixture. The production of a precursor solution or suspension may include the following steps:

(a) Preparing a suspension containing pristine nano graphene platelets (NGPs) dispersed in a liquid medium using, for instance, direct ultrasonication (e.g., a process disclosed by us in U.S. patent application Ser. No. 11/800,728 (May 8, 2007));

(b) Optionally removing some of the liquid from the suspension;

(c) Adding a desired amount of cathode active material-coated graphene sheets to obtain a precursor mixture suspension or solution;

(d) Removing the liquid from the suspension to obtain a precursor mixture solid; and (e) Thermally and/or chemically converting the precursor mixture solid to the graphene-enhanced cathode particulate.

For the preparation of a cathode, multiple graphene-enhanced particulates are mixed with a binder solution (e.g., PVDF in NMP) to obtain a slurry or paste. A desired amount of the slurry or paste is then coated onto a current collector, allowing the liquid to evaporate and leaving behind an electrode bonded to a surface of a current electrode. For examples, particulates containing S-coated graphene sheets and graphite particles embraced by separate graphene sheets may be added to a solution containing a solvent (NMP). The resulting paste may be coated onto an aluminum foil as a current collector to form a coating layer of 50-500 μm thick (preferably 100-250 μm). By allowing the solvent to vaporize one obtains a positive electrode (cathode) for a lithium battery.

In the aforementioned examples, the starting material for the preparation of NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

Multiple graphene sheets suspended in a liquid (e.g. water) may be spray-deposited to form a continuous film of graphene materials, which is deposited with a coating of a cathode active material. The coated film is then broken into pieces of active material-coated graphene sheets. These coated graphene sheets are re-dispersed into a liquid to form a suspension.

The resulting suspension can be converted into micron-scaled droplets (particulates) using several approaches. For instance, the suspension may be aerosolized or atomized to form fine aerosol particles. Concurrently or subsequently, the liquid or solvent is removed to form solid particles that are typically spherical or ellipsoidal in shape with a diameter or major axis typically less than 10. This procedure may be executed by using an aerosol generation, atomization, spray drying, or inkjet printing apparatus. As an optional but preferred procedure, the solid particles are simultaneously or subsequently subjected to a pyrolysis or carbonization treatment to convert the organic or polymeric material, if existing, into a carbon material. The heat treatment of petroleum or coal-based heavy oil or pitch will serve to convert at least part of the oil or pitch into a meso-phase, an optically anisotropic or liquid crystalline phase of a fused aromatic ring structure. The converted pitch is called a meso-phase pitch. Since NGPs are essentially pure graphite-based or graphene materials, this low temperature heat treatment (350-1,200° C.) has no adverse effect on the NGP structure. Essentially, one can use a spray pyrolysis technique, such as ultrasonic spray pyrolysis or electro-spray pyrolysis, to accomplish both the aerosol generation and pyrolysis procedures Another embodiment of the present invention is a lithium battery cathode comprising multiple nano graphene-enhanced cathode particulates as described above. A further embodiment is a lithium battery comprising such a cathode, an anode, a separator disposed between the anode and the cathode, and electrolyte in physical contact with both the anode and the cathode.

There is no particular restriction on the type and nature of the cathode active material, which can be selected for practicing the present invention. The cathode active material may be preferably selected from a metal oxide/phosphate/sulfide, an inorganic material, an organic or polymeric material, or a combination thereof:

a) The group of metal oxide, metal phosphate, and metal sulfides consisting of lithium cobalt oxide, lithium nickel oxide, lithium manganese oxide, lithium vanadium oxide, lithium transition metal oxide, lithium-mixed metal oxide, lithium iron phosphate, lithium manganese phosphate, lithium vanadium phosphate, lithium mixed metal phosphates, transition metal sulfides, and combinations thereof.
   a. In particular, the lithium vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$;
   b. Lithium transition metal oxide may be selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

b) An inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) sulfur, sulfur compound, lithium polysulfide (f) a combination thereof. In particular, $TiS_2$, $TaS_2$, $MoS_2$, $NbSe_3$, non-lithiated $MnO_2$, $CoO_2$, iron oxide, vanadium oxide, or a combination thereof may be used as a cathode active material in a lithium metal cell.

c) An organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly (ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4 (ethylenedithio)thiophene] (PEDTT).

The organic material may include a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

Most preferably, the cathode active material is selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof.

The positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost.

For the preparation of a cathode, the binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, mesophase pitch, coal tar pitch, and petroleum pitch may also be used. Preferable mixing ratio of these ingredients may be 90 to 98% by weight for the particulates, and 2 to 10% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a synthetic resin nonwoven fabric, porous polyethylene film, porous polypropylene film, or porous PTFE film.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery. The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

The following examples serve to illustrate the best mode practice of the present invention and should not be construed as limiting the scope of the invention, which is defined in the claims.

EXAMPLE 1

Graphene Oxide from Sulfuric Acid Intercalation and Exfoliation of MCMBs

MCMB 2528 meso-carbon microbeads were supplied by Alumina Trading, which was the U.S. distributor for the supplier, Osaka Gas Chemical Company of Japan. This material has a density of about 2.24 g/cm$^3$ with a median particle size of about 22.5. MCMB 2528 (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C. for 30 seconds to obtain Sample 1. A small quantity of each sample was mixed with water and ultrasonicated at 60-W power for 10 minutes to obtain a suspension. A small amount was sampled out, dried, and investigated with TEM, which indicated that most of the NGPs were between 1 and 10 layers. The graphene-water suspension was used for subsequent preparation of a precursor mixture containing primary particles of either an anode active material or a cathode active material.

EXAMPLE 2

Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes. Portions of the resulting GO-water suspension were then spin-coated onto a polyimide film to form thin films of GO sheets with various different film thicknesses, from approximately 1 nm to 30 nm.

EXAMPLE 3

Preparation of Cathode Active Material-Coated Graphene Sheets and Secondary Particles Continuous graphene films coated with a cathode active material were prepared from sputtering (e.g. lithium metal oxide), physical vapor deposition (e.g. S), and solution deposition. The coated film was broken, cut into pieces, and then air jet milled to obtain small pieces of active material-coated graphene sheets.

For the preparation of graphene-enhanced particulates, an amount of a selected electrode active material powder (control sample, no supporting graphene sheet) or active material-coated graphene sheets was added to a desired amount of GO suspension to form a precursor mixture suspension with a solid content of approximately 10% by weight. After thorough mixing in an ultrasonication reactor, the suspension was then spray-dried to form the graphene-enhanced secondary particles (particulates). The cathode active materials studied in this example include lithium cobalt oxide, lithium manganese oxide, lithium iron phosphate, vanadium oxide, and sulfur.

EXAMPLE 4

Lithium Iron Phosphate-Coated Graphene Sheets and Cathode Electrodes

A LFP target for sputtering was prepared by compacting and sintering LFT powders together. Sputtering of LFP was conducted on a graphene film and, separately, carbon nano-fiber (CNF) mat. The LFP-coated graphene film was then broken and pulverized to form LFP-coated graphene sheets.

As a control sample, the LFP particle-bonded graphene sheets were also produced by following the procedure proposed by Ding, et al. [Electrochemistry Communications, 12 (2010) pages 10-13].

Experimental data show that NGPs, when incorporated to form graphene-enhanced particulates of the present invention, provide exceptional electrical conductivity characteristics to the electrodes in terms of a much lower percolation threshold and higher electrical conductivity at a given weight % of additive as compared to the corresponding CNT-enhanced or carbon black-enhanced electrodes.

Figure 8:
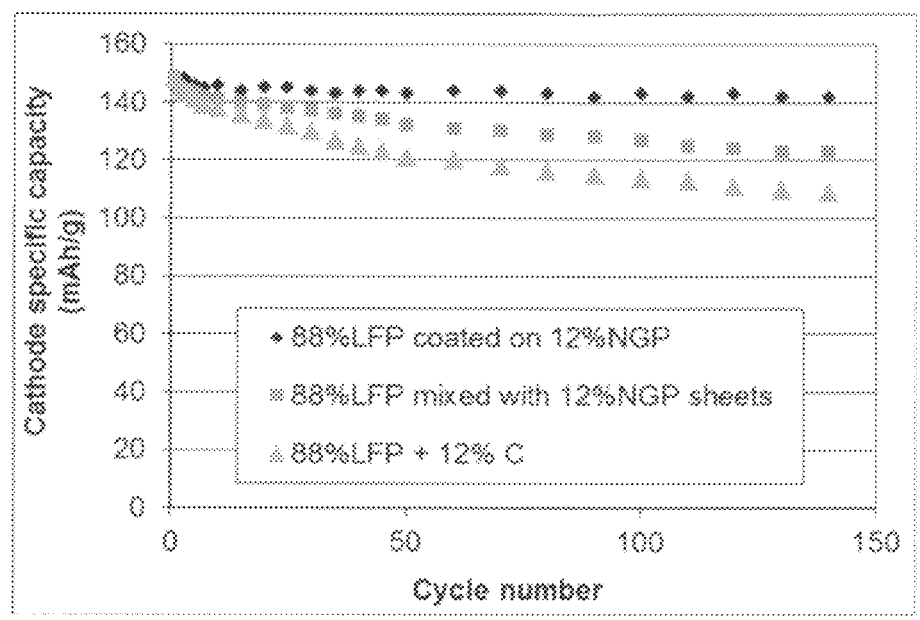
FIG. 8 Cycling behaviors of a lithium-ion battery having a graphene-supported LFP coating cathode of the present invention, those of a battery containing a LFP-graphene sheet mixture cathode, and those of a battery containing a carbon-coated LFP composite-based cathode.

Representative electrochemical testing results are summarized in FIG. 8, which show the cycling behaviors of a lithium-ion battery having a LFP-coated graphene sheet cathode of the present invention, those of a battery containing a graphene-bonded LFP nano particle cathode, and those of a battery containing a carbon-coated LFP composite-based cathode. After 140 charge/discharge cycles, the battery containing a carbon-coated LFP composite-based cathode has lost 26.3% of the original capacity and the battery containing a simple mixture of LFP and graphene sheets for the cathode lost 16.8% of the capacity. In contrast, the battery having a LFP-coated graphene cathode of the present invention has exhibited a 4% capacity loss. This is a highly significant improvement over the prior art.

EXAMPLE 5

Graphene-Enabled $V_2O_5$

Powder of $V_2O_5$ particles was compacted to form a disc-shape target for use in a sputtering chamber. A graphene film prepared from spin-casting of graphene-water suspension was dried and placed under the sputtering target for a controlled duration of time to obtain a $V_2O_5$-coated film. The coated film was then cut into small pieces (approximately 1 cm) and then subjected to ball-milling for further size reduction to obtain $V_2O_5$-graphene sheets.

For the preparation of a control sample, in a typical experiment, vanadium pentoxide gels were obtained by mixing $V_2O_5$ in a LiCl aqueous solution. The $Li^{30}$ -exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nano-belt sizes, and then spray-drying at 200° C. to obtain graphene-embraced composite particulates.

Figure 7:
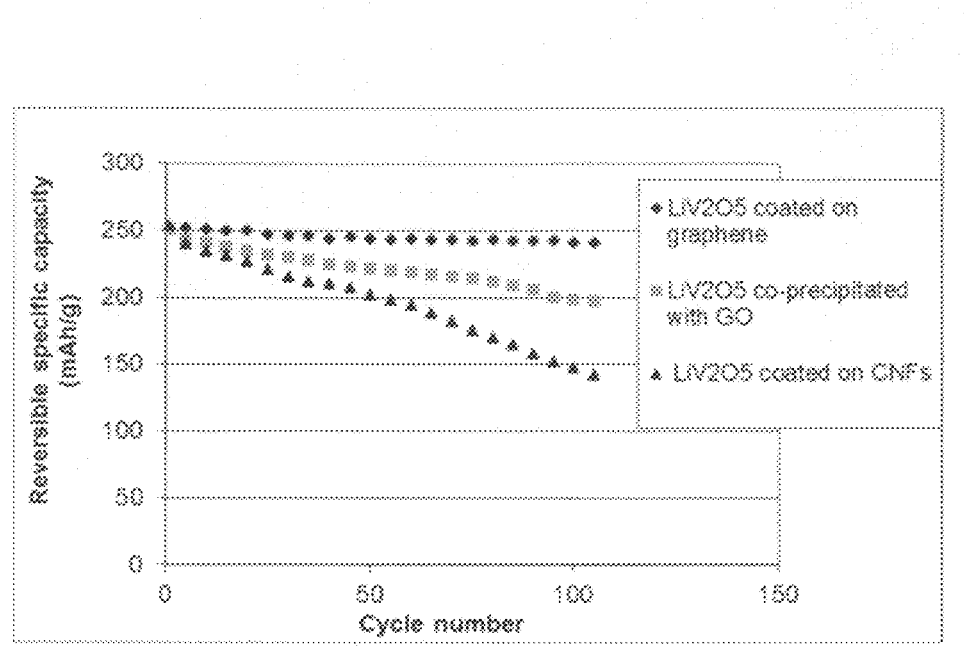
FIG. 7 Cycling behaviors of three lithium batteries having a graphene-supported $V_2O_5$ coating, a graphene/$V_2O_5$ nano particle mixture (co-precipitated $V_2O_5$ with GO), and a carbon nano fiber (CNF)-supported $V_2O_5$ coating, respectively, as a cathode active material.

FIG. 7 shows the cycling behaviors of three lithium batteries having a $V_2O_5$-coated graphene sheet cathode, a graphene/$V_2O_5$ nano particle mixture cathode (co-precipitated $V_2O_5$ with GO), and a carbon nano fiber (CNF)-supported $V_2O_5$ coating cathode, respectively. After 105 cycles, the battery cell having a carbon nano fiber (CNF)-supported $V_2O_5$ coating cathode has suffered a capacity decay of 44% and the battery having a graphene/$V_2O_5$ nano particle composite cathode suffered a capacity decay of 21.5%. In contrast, the battery having a $V_2O_5$-coated graphene sheet cathode has lost less than 4% of its original capacity after 105 cycles, representing a major improvement.

EXAMPLE 6

Metal Naphthalocyanine-Reduced Graphene Oxide (RGO) Hybrid Cathode

CuPc-coated graphene sheets were obtained by vaporizing CuPc in a chamber along with a graphene film (5 nm) prepared from spin coating of RGO-water suspension. The resulting coated film was cut and milled to produce CuPc-coated graphene sheets. Two CuPc coating thicknesses were produced in two separate samples.

Figure 10:
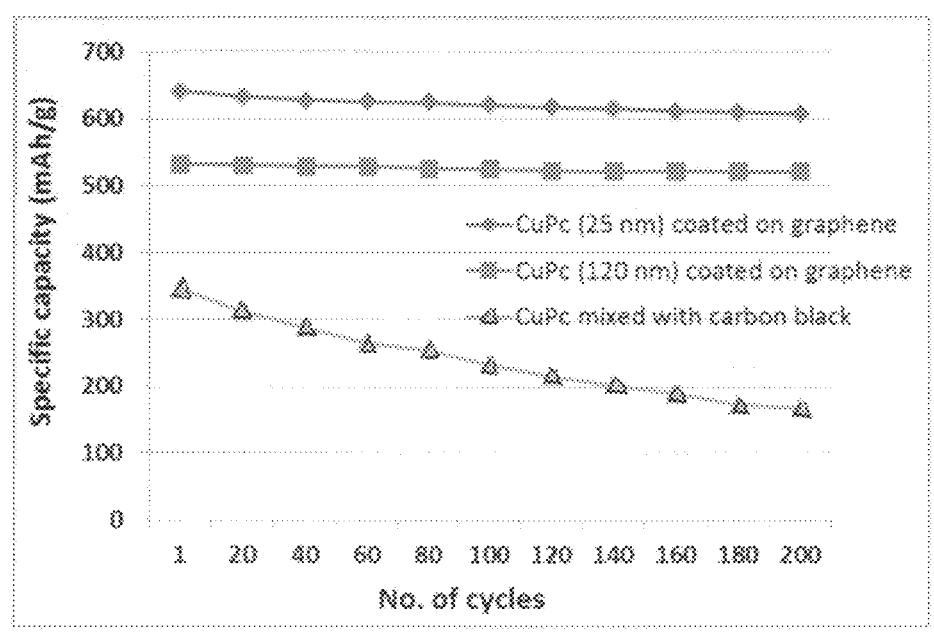
FIG. 10 Cycling behaviors of a lithium metal battery having a graphene-supported CuPc organic coating (25 nm) cathode of the present invention, those of a battery containing a graphene-supported CuPc coating (120 nm) based cathode, and those of a battery containing a CuPc-carbon black composite-based cathode.

The specific capacity of this CuPc-coated graphene sheet electrode was measured by using a coin cell configuration with Li metal as the anode active material and 1 M $LiClO_4$ in propylene carbonate (PC) solution as the electrolyte. A baseline sample of CuPc with 30% by weight of AB (acetylene-derived carbon black) as the conductive additive was also prepared in a similar manner. The charge/discharge behaviors of this cell were also monitored. FIG. 10 shows the cycling behaviors of a lithium metal battery having a graphene-supported CuPc organic coating (25 nm) cathode of the present invention, those of a battery containing a graphene-supported CuPc coating (120 nm) based cathode, and those of a battery containing a CuPc-carbon black composite-based cathode.

There are several significant observations that can be made from these data. First, given the same volume fraction of CuPc, the CuPc-AB composite based cell is capable of delivering an initial specific capacity of only 345 mAh/g, but the graphene-supported CuPc coating (120 nm) based cell has an initial specific capacity of 532 mAh/g, based on measurements conducted at 1 C rate (1 C rate=completing charge or discharge in 1 hour, 2 C rate=completing in ½ hours, and n C rate=completing in 1/n hours, etc). This implies that the use of carbon black as a conductive filler does not enable a high cathode active material utilization rate. The thinner CuPc coating (25 nm) enables a much higher active material utilization rate. Second, the data have also clearly demonstrated that the CuPc-AB composite cathode has a fast capacity decay rate with the specific capacity dropping to an unacceptably low value in less than 100 cycles. In contrast, the cathode active material-coated graphene based batteries (coating thickness of 25 nm and 120 nm) exhibit minimal capacity decay (2-5%) even after 200 cycles.

EXAMPLE 7

Li—S Cells Containing S-Coated Graphene Sheets

S-coated graphene sheets can be easily made by sealing a sufficient amount of sulfur powder and a graphene film (prepared from ultrasonic spraying) in a vacuum chamber (high degree of vacuum is not required). Sulfur can be readily sublimed into vapor by heating the sulfur powder from approximately 145° C. to 210° C. Various S coating thicknesses from a few nanometers to a few μm can be obtained simply by varying the physical vapor deposition times. S-coated graphene sheets are then produced through film cutting and milling.

As a typical procedure for preparing electrochemical testing cells, the working electrodes were prepared by mixing 85 wt % active material (e.g., S-coated graphene sheets), 7 wt % acetylene black (Super-P), and 8 wt % polyvinylidene fluoride (PVDF, 5 wt % solid content) binder dissolved in N-methyl-2-pyrrolidinoe (NMP). After coating the slurries on Al foil, the electrodes were dried at 120° C. in vacuum for 2 h to remove the solvent before pressing. Then, the electrodes were cut into a disk (diameter=12 mm) and dried at 100° C. for 24 h in vacuum. Electrochemical measurements were carried out using CR2032 (3V) coin-type cells with lithium metal as the anode electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assemblies were made in an argon-filled glove-box. The CV measurements were carried out using an Arbin electrochemical workstation at a scanning rate of 1 mV/s. In addition, the electrochemical performances of various cells were also evaluated by galvanostatic charge/discharge cycling at a current density of 50 mA/g. For long-term cycling tests, multi-channel battery testers manufactured by LAND were used.

Figure 9:
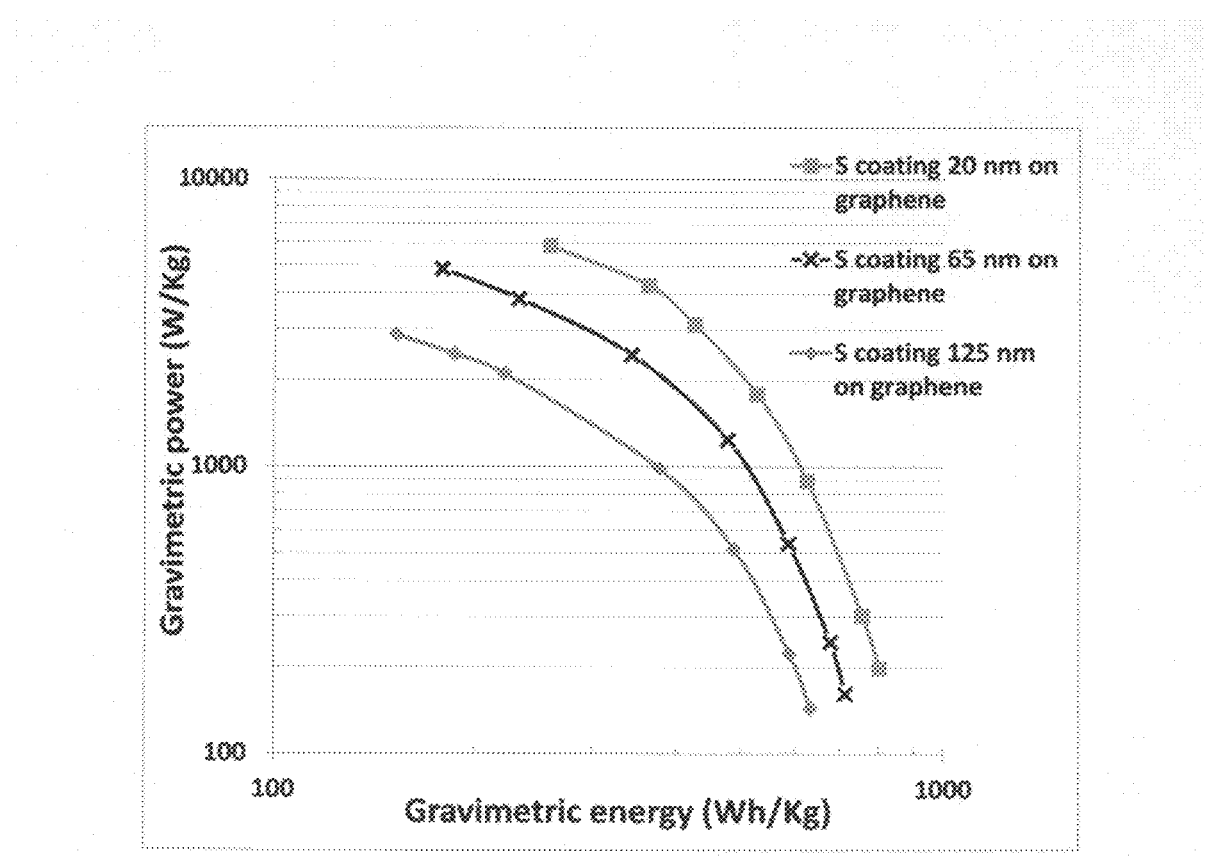
FIG. 9 Ragone plots of three Li—S cells having a S-coated graphene based cathode with a S coating thickness of 20 nm, 65 nm, and 125 nm, respectively.

Some representative data are presented in FIG. 9, which shows the Ragone plots (cell power density vs. energy density) of three Li—S cells having a S-coated graphene based cathode with a S coating thickness of 20 nm, 65 nm, and 125 nm, respectively. Clearly, thinnest coating provides the highest energy density among the three cells. The highest achievable cell energy density of the cell containing the thinnest S coating supported on graphene sheets is as high as 802 Wh/kg, which is 4 times better than the energy density (150-200 Wh/kg) of the best lithium-ion battery cells currently available on the market.

These data have clearly demonstrated the superior advantages of the presently invented cathode active material-coated graphene sheets. The presently invented Li—S battery featuring a S-coated graphene sheet cathode can be charged/discharged for 1,000 cycles without suffering a 20% capacity decay. The high energy density implies that a current electric vehicle with a rating of 300 miles on one battery charge (e.g. Tesla Model-S all battery EV) can be improved to a rating of 1,200 miles on one charge, given the same battery weight. This would reduce the need to build so many charging stations and would also reduce drivers' "range anxiety", the two factors that have thus far prevented all EVs from been widely accepted by consumers. With 1,200 miles per cycle and a life expectancy of approximately 1,000 cycles, the presently invented Li—S battery would enable an EV to run for 1,200,000 miles before needing a battery replacement. This invention represents a very significant accomplishment that can have a dramatic impact on the emergence of a vibrant EV industry.

In conclusion, we have successfully developed a new and novel class of high-capacity cathode active materials (cathode active material-coated graphene sheets) and the relating cathode electrode for lithium batteries. Such a graphene-enhanced particulate platform technology has the following highly desirable features and advantages:

(1) The cathode active material-coated graphene sheets have a very high loading (percentage) of the active material, typically from 60% to 99% (more typically from 90 to 95%) by weight of the cathode active material. The cathode active material coating typically covers 60%-100% of one of the primary surface of a graphene sheet. The length/width of these coated graphene sheets, typically in the range of 0.5-10 µm, are amenable to the fabrication of porous secondary particles having a diameter of 1-10 µm, the most ideal particle sizes for electrode fabrication ease, lithium ion transport, and long-term cycling stability.

(2) The cathode active material coating can be very thin (1 nm-100 nm), enabling fast electron and lithium ion transport, yet still providing a high active material content and being conducive to the formation of electrodes with a desired thickness (100-250 µm). Further, each and every thin active material coating (e.g. non-conducting S) has a conductive backing (graphene substrate). These combined features have never been possible with any prior art cathode active material.

(3) Graphene sheets are of high strength, high electrical conductivity, and high thermal conductivity. Single layer graphene was recently found to exhibit the highest intrinsic strength and highest intrinsic thermal conductivity among all existing materials. High strength imparts good structural integrity to the resulting electrode.

(4) A high thermal conductivity implies a high heat dissipation rate. This is an important feature since the charge and discharge operations of a battery produce a great amount of heat. Without a fast heat dissipation rate, the battery cannot be charged or discharged at a high rate.

(5) The most commonly used conductive additives are carbon black (CB) or acetylene black (AB), which are not very electrically conductive. Graphene sheets have an electrical conductivity (up to 20,000 S/cm) that is several orders of magnitude higher than that of CB or AB (typically 0.01-10 S/cm).

(6) Graphene sheets in the interior and the exterior surface of a particulate provide not only a robust 3-D network of electron-conducting paths and high conductivity, but also enable the electrode materials to be readily made into electrodes with a high tap density and long-term cycling stability.

(7) The embracing graphene sheets effectively isolate the anode active materials (e.g., Si and $SnO_2$ particles) from the electrolyte, which otherwise could react with these active materials, thereby reducing the reversible capacity.

(8) Quite surprisingly, spray-drying readily produces graphene-enhanced particulates of a spherical shape that is conducive to the formation of interconnected pores in an actual electrode to enable easy penetration of electrolyte. The embraced primary particles (coated sheets) having a small thickness (typically smaller than 100 nm) provide a short lithium diffusion path for lithium to enter and leave. This is particularly desirable for power tool and electric vehicle applications where the battery must be capable of being charged and discharged at a high rate.

In summary, the presently invented graphene-enhanced particulates surprisingly impart the following highly desirable attributes to a lithium battery electrode: high reversible capacity, low irreversible capacity, high tap density, electrode fabrication ease (shape of secondary particles typically being spherical or near spherical), small primary particle sizes (for high-rate capacity), compatibility with commonly used electrolytes (embracing graphene sheets help to isolate active material particles from electrolyte), and long charge-discharge cycle life.

The invention claimed is:

1. A cathode electrode of a lithium battery, wherein said cathode electrode comprises a cathode active material-coated graphene sheet, wherein said graphene sheet has two opposed parallel surfaces and at least 50% area of one of said two surfaces is coated with a cathode active material and wherein said graphene material is in an amount of from 0.1% to 99.5% by weight and said cathode active material is in an amount of at least 0.5% by weight, all based on the total weight of said graphene material and said cathode active material combined.

2. The cathode electrode of claim 1, wherein at least 80% area of one of said surfaces is coated with a cathode active material.

3. The cathode electrode of claim 1, wherein said coated graphene sheet contains at least 60% by weight or by volume of said cathode active material based on the total weight of said coated graphene sheet.

4. The cathode electrode of claim 1, wherein said coated graphene sheet contains at least 90% by weight or by volume of said cathode active material based on the total weight of said coated graphene sheet.

5. The cathode electrode of claim 1, wherein said cathode active material is selected from an inorganic material, an organic or polymeric material, a metal oxide/phosphate/sulfide, or a combination thereof.

6. The cathode electrode of claim 5, wherein said cathode active material contains a metal oxide/phosphate/sulfide selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, transition metal sulfide, or a combination thereof.

7. The cathode electrode of claim 5, wherein said inorganic material is selected from sulfur, sulfur compound, lithium polysulfide, transition metal dichalcogenide, a transition metal trichalcogenide, or a combination thereof.

8. The cathode electrode of claim 5, wherein said inorganic material is selected from $TiS_2$, $TaS_2$, $MoS_2$, $NbSe_3$, $MnO_2$, $CoO_2$, an iron oxide, a vanadium oxide, or a combination thereof.

9. The cathode electrode of claim 5, wherein said metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xN_4O_9$, $V_6O_{13}$, $Li_xV_6O_{13}$, their doped versions, their derivatives, and combinations thereof, wherein $0.1<x<5$.

10. The cathode electrode of claim 5, wherein said metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

11. The cathode electrode of claim 5, wherein said inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

12. The cathode electrode of claim 5, wherein said organic material or polymeric material is selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

13. The cathode electrode of claim 12, wherein said thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis (propylthio)benzene] (PTKPTB, or poly[3,4(ethylenedithio) thiophene] (PEDTT).

14. The cathode electrode of claim 5, wherein said organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

15. The cathode electrode of claim 1, wherein said graphene material is selected from pristine graphene, graphene oxide, reduced graphene oxide, graphene fluoride, graphene bromide, graphene iodide, boron-doped graphene, nitrogen-doped graphene, chemically functionalized graphene, or a combination thereof, and said graphene material comprises single-layer or less than 10 graphene planes.

16. The cathode electrode of claim 1, wherein said cathode active material coating has a thickness less than 100 nm.

17. The cathode electrode of claim 1, wherein said cathode active material coating has a thickness less than 50 nm.

18. The cathode electrode of claim 1, wherein said cathode active material coating has a thickness less than 20 nm.

19. The cathode electrode of claim 1, wherein said cathode active material-coated graphene sheet is a part of a secondary particle having a size less than 20 μm.

20. The cathode electrode of claim 1, wherein said cathode active material-coated graphene sheet is a part of a secondary particle having a size less than 5 μm.

21. The cathode electrode of claim 1, further comprising a carbon or graphite material therein, wherein said carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof.

22. A lithium battery containing an anode electrode, a cathode electrode of claim 1, a porous separator and/or electrolyte in contact with said anode electrode and said cathode electrode.

23. The lithium battery of claim 22, further comprising an anode current collector and/or a cathode current collector.

24. The lithium battery of claim 22, wherein said anode electrode contains a lithium metal, lithium metal alloy, or lithium compound as an anode active material.

25. The lithium battery of claim 22, which is a lithium-sulfur cell wherein said anode electrode contains a lithium metal, lithium metal alloy, or lithium compound as an anode active material and said cathode electrode contains sulfur, sulfur compound, or lithium polysulfide as a cathode active material.

26. A process for producing a cathode electrode of claim 1, said process comprising:
 a. providing a continuous film of a graphene material into a deposition zone;
 b. introducing vapor or atoms of a precursor cathode active material into said deposition zone and depositing said vapor or atoms onto a surface of said graphene material to form a coated film of a cathode active material-coated graphene material;

c. mechanically breaking said coated film into multiple pieces of cathode active material-coated graphene sheets; and d. combining multiple pieces of cathode active material-coated graphene sheets with an optional binder resin to form said cathode electrode.

27. The process of claim 26, wherein said step (d) of forming said electrode includes combining multiple pieces of cathode active material-coated graphene sheets with an optional carbon or graphite material and optional graphene sheets to form a plurality of secondary particles having a size less than 20 μm and combining said secondary particles with said optional binder resin to form said electrode.

28. The process of claim 26, wherein said continuous film of a graphene material is produced by spraying a graphene suspension onto a solid substrate, wherein said graphene suspension contains a graphene material dispersed in a liquid medium, and by removing said liquid medium.

29. The process of claim 26, wherein said continuous film of a graphene material is produced by chemical vapor deposition of a graphene material onto a solid substrate.

30. The process of claim 26, wherein said coated film of a cathode active material-coated graphene material has a cathode active material coating thickness less than 500 nm.

31. The process of claim 26, wherein said step (b) of forming a cathode active material-coated graphene material entails chemical vapor deposition, physical vapor deposition, sputtering, or laser-assisted thin-film deposition of a cathode active material onto a film of a graphene material.

32. The process of claim 26, wherein said step (c) of mechanical breaking entails air jet milling, impact milling, grinding, mechanical shearing, ultrasonication, or a combination thereof.

33. The process of claim 27, wherein said step of combining said multiple pieces of cathode active material-coated graphene sheets into a secondary particle comprises dispersing said multiple pieces of cathode active material-coated graphene sheets in a liquid medium to form a multi-component suspension and drying said multi-component suspension to form said secondary particle using a spray-drying, spray-pyrolysis, fluidized-bed drying, atomization, or aerosolizing step.

34. The process of claim 26, wherein said step (a) of providing a continuous film of a graphene material includes feeding said continuous film from a feeder roller into said deposition zone and said step (b) further includes collecting said coated film onto a winding roller.

35. The process of claim 26, further comprising a step of separating or removing said graphene sheet from said cathode active materials and a step of collecting said cathode active material.

* * * * *